United States Patent
Mimura

(10) Patent No.: US 7,950,813 B2
(45) Date of Patent: May 31, 2011

(54) COMPOSITE TRIANGULAR-PYRAMIDAL CUBE-CORNER RETROREFLECTIVE SHEETING AND RETROREFLECTIVE ARTICLES

(75) Inventor: Ikuo Mimura, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 309 days.

(21) Appl. No.: 11/718,310

(22) PCT Filed: Nov. 2, 2005

(86) PCT No.: PCT/JP2005/020493
§ 371 (c)(1),
(2), (4) Date: Apr. 30, 2007

(87) PCT Pub. No.: WO2006/049313
PCT Pub. Date: May 11, 2006

(65) Prior Publication Data
US 2009/0122405 A1    May 14, 2009

(30) Foreign Application Priority Data

Nov. 2, 2004  (JP) .................. 2004-319763

(51) Int. Cl.
*G02B 5/124* (2006.01)

(52) U.S. Cl. ...................................... 359/530

(58) Field of Classification Search .......... 359/529–530, 359/833–837
See application file for complete search history.

(56) References Cited

U.S. PATENT DOCUMENTS

| | | | |
|---|---|---|---|
| 2,481,757 | A | 2/1943 | Jungersen |
| 3,712,706 | A | 1/1973 | Stamm |
| 4,202,600 | A | 5/1980 | Burke et al. |
| 4,775,219 | A | 10/1988 | Appeldorn et al. |
| 5,138,488 | A | 8/1992 | Szczech |
| 5,171,624 | A | 12/1992 | Walter |
| 5,565,151 | A | 10/1996 | Nilsen |
| 5,706,132 | A | 1/1998 | Nestegard et al. |
| 6,390,629 | B1 | 5/2002 | Mimura et al. |
| 6,413,615 | B2 * | 7/2002 | Smith et al. .................. 428/157 |
| 6,626,544 | B2 * | 9/2003 | Lu et al. ....................... 359/530 |

FOREIGN PATENT DOCUMENTS

| | | |
|---|---|---|
| EP | 137736 B1 | 10/1992 |
| EP | 548280 B1 | 9/1994 |
| JP | 50-40953 | 11/1975 |
| JP | 06-273608 | 9/1994 |
| JP | 11-305017 | 5/1999 |
| WO | 95/11471 | 4/1995 |
| WO | 01/20373 | 3/2001 |

* cited by examiner

*Primary Examiner* — Stephone B Allen
*Assistant Examiner* — Jennifer L. Doak
(74) *Attorney, Agent, or Firm* — Fitzpatrick, Cella, Harper & Scinto

(57) ABSTRACT

Adoption of composite cube-corner retroreflective elements in which groups of each at least two sub-retroreflective elements which are each defined by three lateral faces mutually crossing at approximately right angles, as being configured by three-directional V-shaped parallel groove groups having substantially symmetrical sections and intersecting with each other, and which are arrayed in the closest-packed state, projecting on one side of their common sub-plane (SH-SH), each of said groups of sub-reflective elements being disposed on one main retroreflective element which is defined by three lateral faces mutually crossing at approximately right angles, as being configured by three-directional V-shaped parallel groove groups having substantially symmetrical sections and intersecting with each other, and which is disposed on the main plane (S-S).

18 Claims, 6 Drawing Sheets

COMPOSITE TRIANGULAR-PYRAMIDAL CUBE-CORNER RETROREFLECTIVE SHEETING AND RETROREFLECTIVE ARTICLES

TECHNICAL FIELD

This invention relates to a composite triangular-pyramidal cube-corner retroreflective sheeting of novel structure and retroreflective articles. More specifically, the invention relates to a cube-corner retroreflective sheeting on which triangular-pyramidal reflective elements of novel structure are arrayed in the closest-packed state, and to the retroreflective articles.

In particular, the invention relates to cube-corner retroreflective sheeting and retroreflective articles comprising triangular-pyramidal cube-corner retroreflective elements (which may be hereafter referred to simply as triangular-pyramidal reflective elements), which are useful for signs such as road signs (common traffic signs, delineators), road surface signs (pavement marker), construction signs and the like; number plates on vehicles such as automobiles, motorcycles and the like; safety materials such as reflective tapes stuck on bodies of tracks, trailers and the like, clothing, life preservers and the like; marking on signboards and the like; and reflection plates of visible light-, laser beam- or infrared light-reflective sensors and the like; and to the retroreflective articles.

Specifically, the invention relates to triangular-pyramidal cube-corner retroreflective sheeting and to retroreflective articles which are characterized by comprising composite cube-corner retroreflective elements in which groups of each at least two sub-retroreflective elements which are each defined by three lateral faces mutually crossing at approximately right angles, as being configured by three-directional V-shaped parallel groove groups having substantially symmetrical sections and intersecting with each other, and which are arrayed in the closest-packed state, projecting on one side of their common sub-plane (SH-SH), each of said groups of sub-reflective elements being disposed on one main retroreflective element which is defined by three lateral faces mutually crossing at approximately right angles, as being configured by three-directional V-shaped parallel groove groups having substantially symmetrical sections and intersecting with each other, and which is disposed on the main plane (S-S).

BACKGROUND ART

Retroreflective sheetings and retroreflective articles which reflect incoming light rays toward the light sources are well known, and such sheetings whose retroreflectivity is utilized are widely used in the fields as above-described. Of those, particularly cube-corner retroreflective sheetings and retroreflective articles which utilize the retroreflection principle of cube-corner retroreflective elements such as triangular-pyramidal reflective elements exhibit drastically higher retroreflectivity of light compared with those of conventional micro glass bead retroreflective sheetings or retroreflective articles, and due to the excellent retroreflective performance their utility is yearly increasing.

Whereas, retroreflective sheetings and retroreflective articles using triangular-pyramidal cube-corner retroreflective elements are generally subject to a defect of inferior entrance angularity, because the light rays entering into their reflective lateral faces at the angles less than the critical angle that satisfies the total internal reflection condition determined by the ratio of the refractive index of individual transparent medium constituting retroreflective elements to the refractive index of ambient air, are not totally reflected at interfaces of the reflective lateral faces but are transmitted to the backs of the reflective lateral faces. That is, while they exhibit favorable retroreflectivity within a range at which the entrance angle formed between the retroreflective sheeting surface and incident light is small, there is a problem that the retroreflectivity rapidly drops with increase in the entrance angle.

On the other hand, a triangular-pyramidal retroreflective element can reflect light rays in their entering directions at nearly the whole surfaces thereof, not allowing excessive divergence of reflected light caused by such factors as spherical aberration observed with micro glass bead reflective elements, and hence exhibits excellent retroreflective performance.

Nevertheless, retroreflected light with excessively narrow divergence angle is apt to invite inconvenience in its practical application, e.g., when light rays emitted from head lamps of a car are retroreflected by a traffic sign, the retroreflected light is difficult to reach the eyes of the person driving the car, at positions deviating from the optical axis of the light. Such an inconvenience is particularly enhanced as the distance between the car and the traffic sign is shortened, because of the increase in the observation angle, which is defined as an angle formed between the incident axis of the light and the observation axis connecting the driver and the point of reflection. That is, heretofore known triangular-pyramidal cube-corner retroreflective elements in general are subject to the problem of inferior observation angularity.

Furthermore, because a triangular-pyramidal cube-corner retroreflective element is formed of three reflective lateral faces and its retroreflective performance varies depending on the direction of incident light entering the lateral faces (azimuth angle), the direction of the elements at the time of installation on a triangular-pyramidal cube-corner retroreflective sheeting must be the same. Thus, triangular-pyramidal cube-corner retroreflective elements have a problem of dependency of their retroreflective performance on azimuth angle, i.e., a problem in azimuth angularity.

Heretofore known triangular-pyramidal cube-corner retroreflective elements furthermore have optical axes. An optical axis is defined as an axis passing the apex of a triangular-pyramidal cube-corner retroreflective element, which is equidistanced from the three reflective lateral faces intersecting each other at substantially right angles and constituting the retroreflective element.

For improving entrance angularity or observation angularity of cube-corner retroreflective sheetings and retroreflective articles, in particular, triangular-pyramidal cube-corner retroreflective sheetings and retroreflective articles, many proposals have been made of old and various improving means have been investigated.

For example, U.S. Pat. No. 2,481,757 to Jungersen describes installation of various forms of retroreflective elements on a thin sheet. Triangular-pyramidal reflective elements which are exemplified in said US patent include those with untilted optical axes, their apices corresponding to the center points of their triangular bases, and those with tilted optical axes, their apices not corresponding to the center points of their triangular bases. The patent states that the sheeting effectively reflects light rays toward an approaching car (improvement in entrance angularity).

As the size of the triangular-pyramidal reflective elements, the same patent states, in terms of depth of the elements, up to one tenth of an inch (2,540 µm). Furthermore, FIG. 15 of this US patent shows a triangular-pyramidal reflective element pair whose optical axes are tilted in positive (+) directions as explained later, the angle of tilt (θ) of each optical axis being presumed to be approximately 6.5°, as calculated from the length ratio between the longer side and the shorter side of the triangular base of the shown triangular-pyramidal reflective element.

Said US patent to Jungersen, however, contains no specific disclosure about extremely small size triangular-pyramidal reflective elements as described later, or no disclosure or suggestion about the desirable size or tilt in optical axis of triangular-pyramidal reflective elements for exhibiting excellent observation angularity or entrance angularity.

U.S. Pat. No. 3,712,706 to Stamm discloses a retroreflective sheeting and a retroreflector in which so called regular triangular-pyramidal cube-corner retroreflective elements whose triangular bases are in the shape of regular triangles are arranged in the closest-packed state with said bases lying on a common plane of a thin sheet. This US patent to Stamm specularly reflects incident light by vapor depositing a metal such as aluminum on reflective surfaces of the reflective elements, to increase the incident angle, whereby improving the problem such as the drop in retroreflective efficiency and the drawback that the incident light entered at an angle less than the total internal reflection condition transmits through interfaces of the elements and does not retroreflect.

However, because the above proposal by Stamm provides a specular layer on reflective sides as a means to improve wide angularity, such drawbacks as that appearance of the formed retroreflective sheeting and retroreflector is apt to become dark, or the metal used for the specular layer such as aluminum or silver is oxidized during use by infiltrated water or air, which leads to occasional decrease in reflective performance. Furthermore, this patent is entirely silent on the means for improving wide angularity by tilting optical axes.

EP 137,736 B1 to Hoopman describes a retroreflective sheeting and retroreflector in which multitude of pairs of tilted triangular-pyramidal cube-corner retroreflective elements having their bases on a common plane are arranged at the highest density on a thin sheet, each pair of said elements having isosceles triangular bases and being rotated 180° from one another. The optical axis of the triangular-pyramidal cube-corner retroreflective element as described in this patent is tilted in negative (−) direction in the sense described in the present specification, the angle of tilt being about 7°-13°.

U.S. Pat. No. 5,138,488 to Szczech also discloses a retroreflective sheet and retroreflective article, in which tilted triangular-pyramidal cube-corner retroreflective elements each having an isosceles triangular base are arranged on a thin sheet in such a manner that their bases are on a common plane at the highest density. In this US patent, optical axes of each two triangular-pyramidal reflective elements, which face each other and form a pair, are tilted toward the common edge therebetween, i.e., in the positive (+) direction as later explained, the angle of tilt being about 2°-5° and the element height being 25 μm-100 μm.

Also in EP 548,280 B1 corresponding to the above patent states that the direction of tilt in the optical axes is such that the distance between the apex of the element and a plane, which contains the common edge of said pair of elements and is perpendicular to the common base plane, is not equal to the distance between said perpendicular plane and the point of intersection of the optical axis with the common plane, the angle of tilt being about 2°-5° and the element height being 25 μm-100 μm.

As above, EP 548,280 B1 to Szczech proposes an angle of tilt of the optical axis within a range of about 2°-5°, inclusive of both positive (+) and negative (−) regions. Examples given in said US patent and EP patent to Szczech, however, disclose only those triangular-pyramidal reflective elements with their optical axes canted with an angle of tilt of (−) 8.2°, (−) 9.2° or (−) 4.3°, having an element height (h) of 87.5 μm.

On the other hand, as a proposal for improving observation angularity, for example, U.S. Pat. No. 4,775,219 to Appeldorn attempts to improve observation angularity with a product in which the V-shaped grooves forming the elements are asymmetric, being slightly deflected from the theoretical V-shaped groove angle forming the cube-corners, and furthermore the deflection causing the asymmetry of adjacent V-shaped grooves is periodically changed.

Such periodical change in adjacent V-shaped groove angles, however, increases difficulty in mold processing. Even if the difficulty could be overcome, number of possible combinations of the deflections is limited and cannot provide uniform spreading of reflected light. Moreover, plural kinds of processing tools for forming the V-shaped grooves, such as diamond-tipped cutting tools, must be used per one V-shaped groove group in single direction. Furthermore, high-precision processing technique is required for forming asymmetrical V-shaped grooves.

U.S. Pat. No. 5,171,624 to Walter discloses triangular-pyramidal retroreflective element with reflective surfaces having a uniform quadratic section, which is formed with a machining tool with curved sectional configuration. Such a triangular-pyramidal retroreflective element formed of the reflective sides having quadratic surfaces allows adequate divergence of light and achieves improvement in observation angularity. Whereas, it is extremely difficult to manufacture such processing tools having curved sections and hence it is very difficult to obtain quadratic surfaces according to an intended design, due to the difficulty in obtaining the tools.

U.S. Pat. No. 5,565,151 to Nilsen attempted to improve observation angularity by removing a part of the reflecting faces, and promoting divergence of retroreflected light with the whereby formed trigonal prism portions and new reflecting faces.

However, the Nilsen invention contains little specific disclosure such as what shape of the trigonal prisms is preferred or at what angles the new-reflecting faces are preferably formed. The invention also requires a special tool for removing a part of the reflecting faces to configure the trigonal prismatic portions. Still in addition, the newly formed trigonal prismatic elements have no retroreflective function but simply serve to spread retroreflected light by dispersing the light into various directions.

In U.S. Pat. No. 4,202,600 to Bruke, et al and U.S. Pat. No. 5,706,132 to Nestegard, et al, attempts to uniformize retroreflectivity of light rays entering at different azimuth angles (azimuthal orientation) are disclosed, by combining plural zones in which element groups having different azimuth angles are arrayed.

As above, those triangular-pyramidal cube-corner retroreflective elements known from U.S. Pat. No. 2,481,757 to Jungersen, U.S. Pat. No. 3,712,706 to Stamm, EP 137,736 B1 to Hoopman, U.S. Pat. No. 5,138,488 and corresponding EP 548,280 B1 to Szczech have the features in common, as illustrated in FIG. 6, that the multitude of triangular-pyramidal reflective elements, which play the kernel role in receiving entering light and reflecting the same, have their bases positioned on a common plane and that each of matched pairs facing with each other have similar configuration and equal height. Such retroreflective sheets and articles constructed of triangular-pyramidal reflective elements with their bases positioned on a same plane are invariably inferior in entrance angularity, i.e., they are subject to a defect that retroreflective performance rapidly drops with increased entrance angle of light rays entering into the triangular-pyramidal reflective elements.

Also those known U.S. Pat. No. 4,775,219 to Appeldorn, U.S. Pat. No. 5,171,624 to Walter, and U.S. Pat. No. 5,565,151 to Nilsen proposed improvement in observation angularity by various means as above-described, but all of the inventions have the shortage that manufacturing of tools therefor or mold processing are difficult.

DISCLOSURE OF THE INVENTION

An object of the present invention is to improve the problems with entrance angularity, observation angularity and azimuth angularity remaining in heretofore known triangular-pyramidal cube-corner retroreflective sheeting and retroreflective articles as above.

Another object of the invention is to improve retroreflection performance of signs such as road signs (common traffic signs, delineators), road surface signs (pavement marker), construction signs and the like; number plates on vehicles such as automobiles, motorcycles and the like; safety materials such as reflective tapes stuck on bodies of tracks, trailers and the like, clothing, life preservers and the like; marking on signboards and the like; and reflection plates of visible light-, laser beam- or infrared light-reflective sensors and the like; which use triangular-pyramidal cube-corner retroreflective sheeting or retroreflective articles.

The invention achieves the improvements in entrance angularity, observation angularity and azimuth angularity over those of heretofore known retroreflective elements, with use of composite cube-corner retroreflective elements in which groups of each at least two triangular-pyramidal cube-corner retroreflective elements which are each defined by three lateral faces mutually crossing at approximately right angles, as being configured by three-directional V-shaped parallel groove groups having substantially symmetrical sections and intersecting with each other, and which are arrayed in the closest-packed state, projecting on one side of their common sub-plane (SH-SH), each of said groups of sub-retroreflective elements being disposed on one main retroreflective element which is defined by three lateral faces mutually crossing at approximately right angles, as being configured by three-directional V-shaped parallel groove groups having substantially symmetrical sections and intersecting with each other, and which is disposed on the main plane (S-S). Use of such composite elements promotes, in particular, improvement in observation angularity.

Above-described improvements are furthermore achieved by use of above-described composite cube-corner retroreflectice elements in which the sub-plane (SH-SH) and the main plane (S-S) are in parallel. Particularly, use of such composite elements promotes improvement in observation angularity.

Above-described improvements are also achieved by use of above-described composite cube-corner retroreflective elements in which the optical axes of the sub-reflective elements and/or the main reflective elements are tilted. Adoption of such composite elements particularly promotes improvement in entrance angularity.

Use of above-described composite cube-corner retroreflective elements in which, among the base lines in the three directions which define the main reflective element and the base lines in other three directions which define the sub-reflective elements, the directions of at least one set of the base lines are not in parallel, and preferably directions of that set of the base lines are right angled, also achieves the objects of the present invention and promotes improvement particularly in azimuth angularity.

Furthermore, such improvements in all of the entrance angularity, observation angularity and azimuth angularity can be effectively accomplished by combining the invention with known improving techniques as referred to in the above.

Those triangular-pyramidal cube-corner retroreflective sheetings and retroreflective articles comprising the composite cube-corner retroreflective elements according to the present invention exhibit excellent entrance angularity, observation angularity and azimuth angularity which cannot be expected of heretofore known retroreflective elements.

BEST MODE FOR CARRYING OUT THE INVENTION

Figure 1:
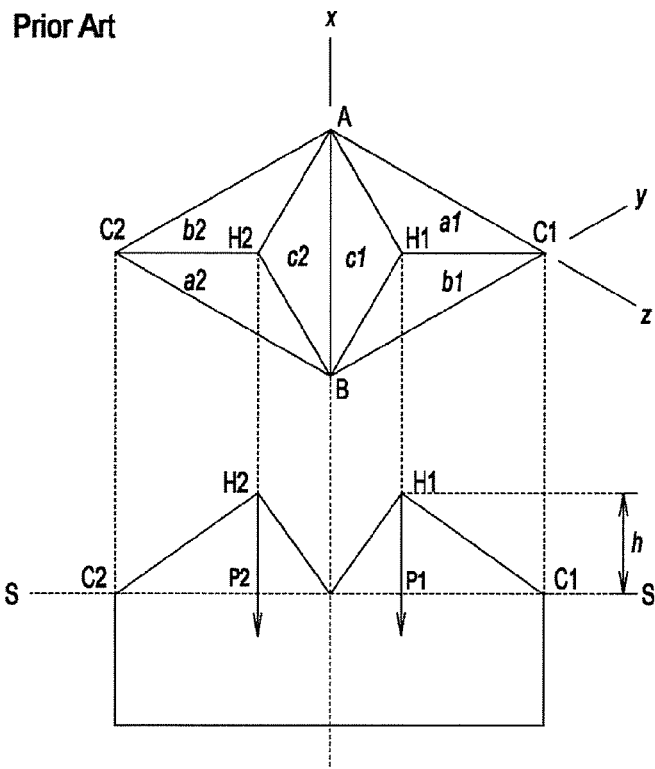
FIG. 1 shows a known retroreflective element.

In this occasion of explaining best mode for carrying out the invention, known triangular-pyramidal cube-corner retroreflective elements (which may also be referred to as "retroreflective elements") are explained, referring to the drawings.

FIG. 1 is to explain a known triangular-pyramidal cube-corner retroreflective element, which shows a pair of retroreflective elements (A-B-C1-H1, A-B-C2-H2) which face each other, having a base line (A-B) in common. The elements shown in FIG. 1 are generally referred to as a regular triangular-pyramidal cube-corner retroreflective element pair, whose three identical right-angled isosceles triangular reflective lateral faces (a1, b1, c1 and a2, b2, c2) mutually intersect at approximately right angles, as configured by three-directional (x, y and z directions) V-shaped parallel groove groups which have substantially symmetrical sections and which intersect with each other at an angle of 60°. These reflective element pairs are arrayed on a common plane (S-S).

Optical axes of the retroreflective elements as shown in FIG. 1 perpendicularly cross with the common plane (S-S), and are not tilted.

Because the elements are generally in the shape of triangles, their retroreflective performance varies depending on the direction of entering light (azimuthal orientation). Referring to FIG. 1, retroreflective performance when a light enters in a direction parallel to the base line (A-B) is not equal to that when the light perpendicularly enters. Such dependency of retroreflective performance on azimuthal orientation is a problem with triangular-pyramidal cube-corner reflective elements.

In FIG. 1, the element size can be represented by the height (h: hereafter may be referred to as "element height") from the apex to the common plane (S-S). The light entering the reflective element is retroreflected with spread, as diverged due to the diffraction effect determined by the element size. That is, when the element height (h) decreases, the diffraction effect increases, enhancing the spread of the retroreflected light to improve observation angularity. Whereas, with reflective elements of excessively small element height (h), the divergence becomes excessive to lessen their retroreflective performance.

A specular layer may be provided on reflective lateral faces (a1, b1, c1 and a2, b2, c2) of the reflective elements. As the specular layer, various metallic reflective substances such as aluminum, silver nickel, copper and the like can be used. Reflective elements which are provided with such a specular layer can reflect also the light rays entering at incident angles greater than the critical angle, and can exhibit improved entrance angularity. The elements, however, come to show a defect of darkened appearance.

Figure 2:
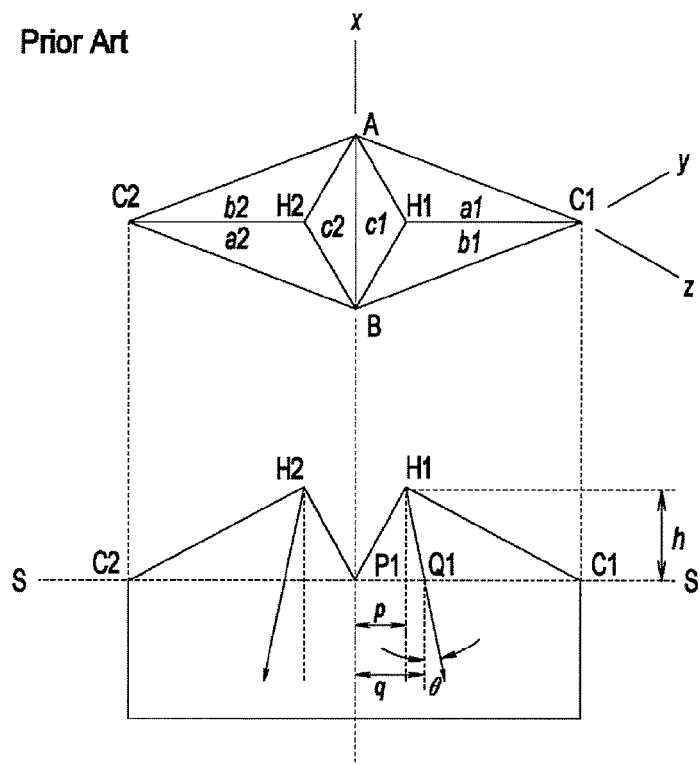
FIG. 2 shows a known retroreflective element.

Similarly, FIG. 2 is to explain a known triangular-pyramidal cube-corner retroreflective element with tilted optical axes (tilted reflective elements).

FIG. 2 shows tilted retroreflective elements wherein the difference (q-p) is not zero, where the distance (p) is that between the point of intersection (P) of a vertical line from the apex with the common plane (S-S) and the base line (A-B), and the distance (q) is that between the point of intersection (Q) of the optical axis with the common plane (S-S) and the base line (A-B).

In particular, FIG. 2 shows "positive" tilted elements wherein (q-p) is positive. Because so tilted reflective elements exhibit improved retroreflective performance in the direction toward the tilted optical axis, they excel in entrance angularity. Such improvement in entrance angularity according to the principle of tilted optical axis can be achieved in both cases wherein (q-p) is positive (positively tilted reflective element) or negative (negatively tilted reflective element).

Figure 3:
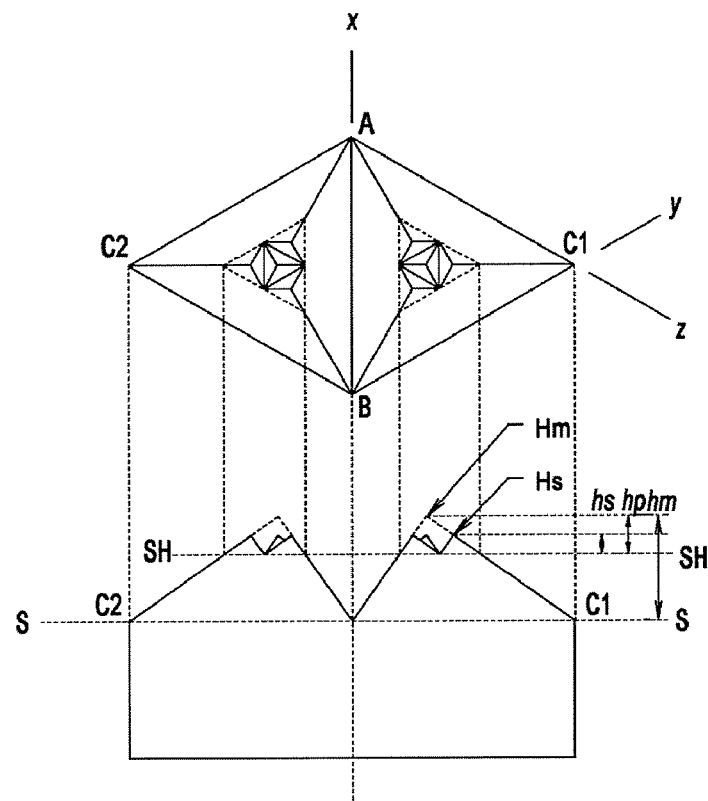
FIG. 3 shows a retroreflective element according to the present invention.

FIG. 3 illustrates an embodiment of composite triangular-pyramidal cube-corner retroreflective elements according to the present invention, which have regular triangular bases and untilted optical axes.

In FIG. 3, a group of four sub-reflective elements, which are defined by three reflective lateral faces intersecting with each other at approximately right angles, as formed by three-directional V-shaped parallel groove groups having substantially symmetrical sections and intersecting with each other, are arrayed in the closest-packed state, projecting on one side of their common sub-plane (SH-SH). The height of the elements as expressed by the distance from their apices to the common sub-plane (SH-SH) is shown as hs.

The sub-reflective element group is arrayed on one main reflective element with a regular triangular base (A-B-C1 or A-B-C2) which is defined by three reflective lateral faces intersecting with each other at approximately right angles, as formed by three-directional V-shaped parallel groove groups having substantially symmetrical sections and intersecting with each other, which are provided on the main plane (S-S).

The distance from the imaginary apex (Hm), at which the three reflective lateral faces forming the element would intersect when extended, to the main plane (S-S) is hm. The sub-plane (SH-SH) common among the sub-reflective element group is distanced from the imaginary apex (Hm) by hp.

In FIG. 3, the three-directional base lines forming the main reflective element and the other three directional base lines forming the sub-reflective element group are invariably in parallel and the triangles providing the base lines are similar. In all of the elements tilt angle of optical axes is 0°.

Composite reflective elements as illustrated in FIG. 3 exhibit effective retroreflective performance by the virtue of the main reflective elements and at the same time cause divergence of reflected light by the diffraction effect of the sub-reflective elements, whereby achieving improvement in observation angularity.

Figure 4:
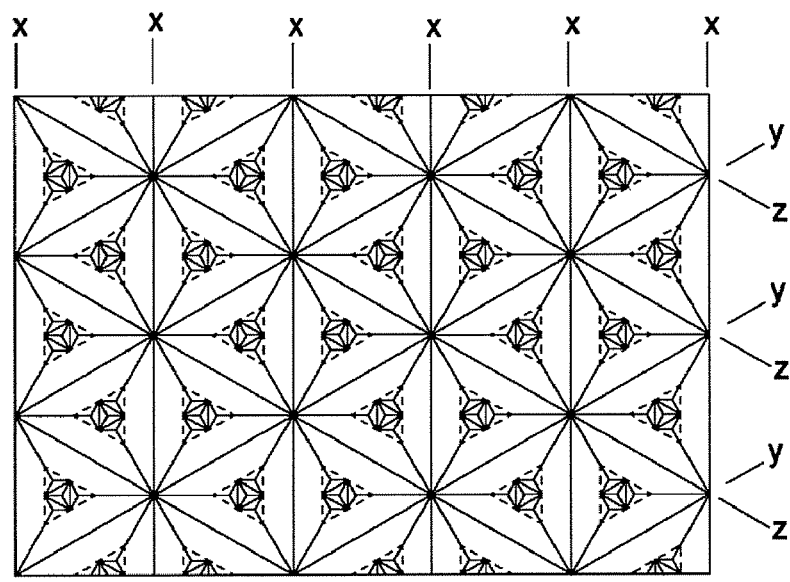
FIG. 4 shows an assembly of retroreflective elements according to the present invention

FIG. 4 shows an array of the closest-packed composite triangular-pyramidal cube-corner retroreflective elements which are illustrated in FIG. 3, having the base lines of their main reflective elements in common. The main reflective elements are configured by three-directional V-shaped parallel groove groups (x, y, z) having substantially symmetrical sections, and the three-directional V-shaped parallel groove groups forming those sub-reflective elements are in parallel with the V-shaped parallel groove groups (x, y, z) forming the main reflective elements, the base lines of said V-formed groove groups being on their common sub-plane (SH-SH).

Figure 5:
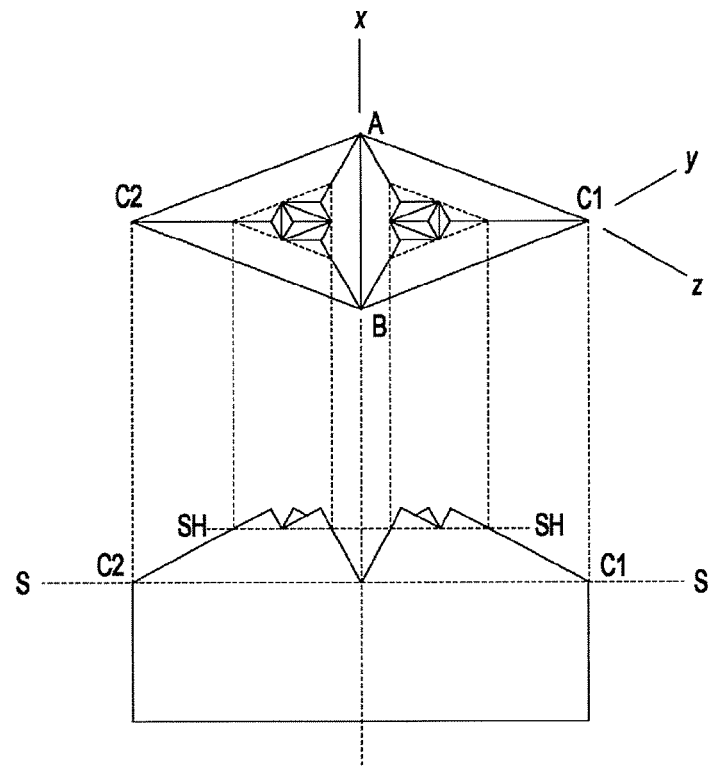
FIG. 5 shows a retroreflective element according to the present invention.

FIG. 5 shows composite retroreflective elements wherein, on the positively tilted main reflective elements having its optical axis tilted in the direction with a positive value of (q-p), four sub-reflective elements of less element height having the same tilt of optical axis are arrayed. Such composite retroreflective elements accomplish improvement in entrance angularity by the tilt of the optical axes and that in observation angularity by the sub-reflective elements.

The improvement in entrance angularity by the composite retroreflective elements of FIG. 5 can be achieved with either of positive or negative tilt (q-p) of their optical axes. It is preferable that the composite retroreflective elements have an angle of tilt in the optical axes of the sub-reflective elements and/or main reflective elements within a range of 1-13°, in particular, 1.5-7°.

Where the angle of tilt in optical axes is less than 1°, improvement in entrance angularity is negligible, while reflective elements having large angle of tilt exceeding 13° are apt to invite a drawback of decreased retroreflectivity in the frontal direction.

Figure 6:
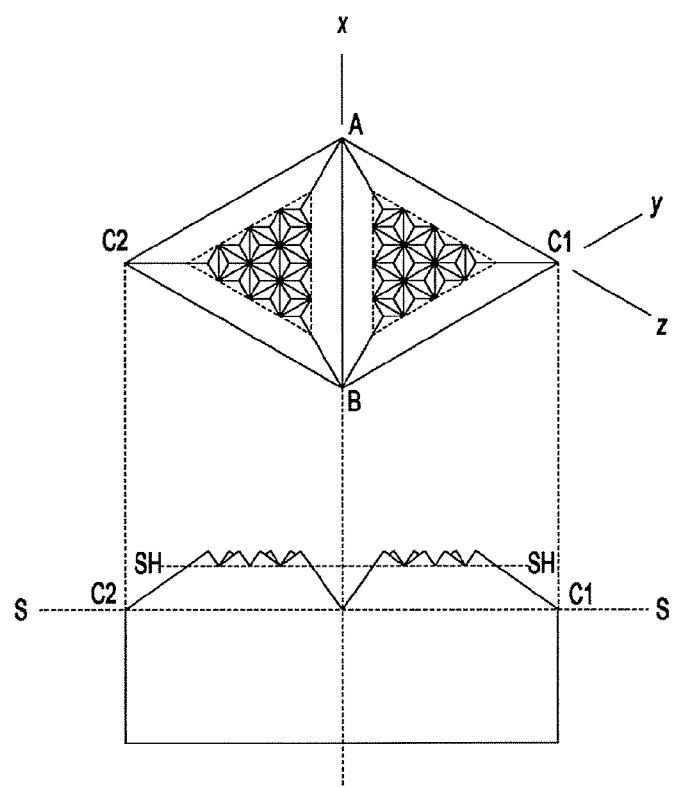
FIG. 6 shows a retroreflective element according to the present invention.

FIG. 6 illustrates another embodiment of the composite triangular-pyramidal cube-corner retroreflective elements according to the present invention, having regular triangular bases and untilted optical axes similarly to those as shown in FIG. 3, in which the number of sub-reflective elements is on one main reflective element 16, the sub-reflective elements having a less height than those in FIG. 3.

In the composite reflective elements of FIG. 6, similarly to those shown in FIG. 3 three-directional base lines defining each main reflective element and the other three-directional base lines defining each sub-reflective element are invariably in parallel, the triangles providing base lines of the sub-reflective elements and those of the main reflective elements are similar, and the angle of tilt in optical axes of all the elements is 0°.

Figure 7:
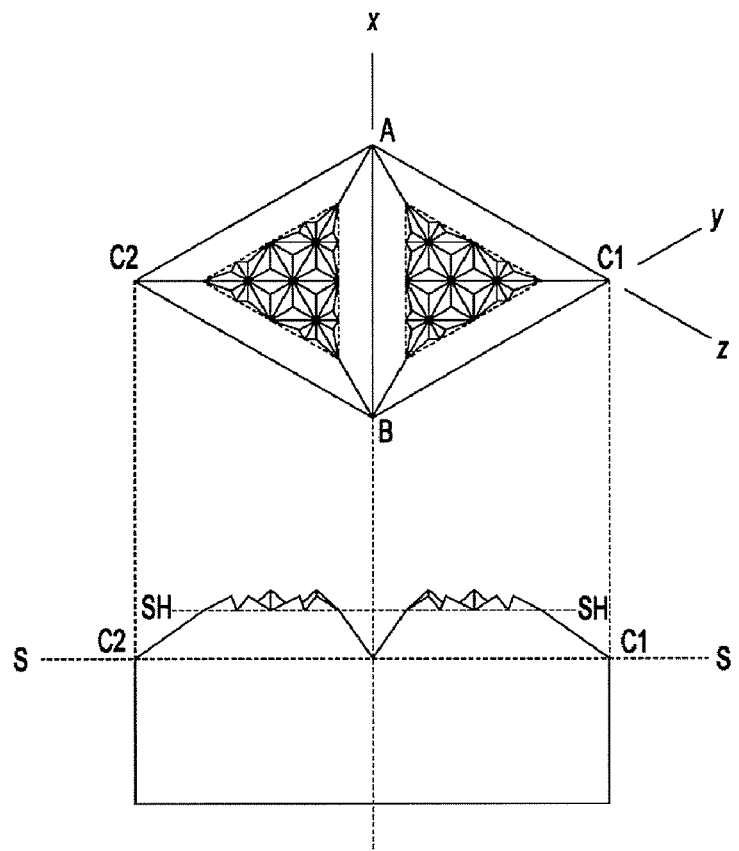
FIG. 7 shows a retroreflective element according to the present invention.

Whereas, FIG. 7 shows another embodiment of the composite triangular-pyramidal cube-corner retroreflective elements according to the present invention, having regular triangular bases and untilted optical axes, wherein the number of the sub-reflective elements in complete shape is on one main reflective element 6, the rest of sub-reflective elements being cut off with the reflective lateral faces of the main reflective element.

Among the three-directional base lines which define the main reflective element with the base lines in other three directions which define the sub-reflective elements, directions of one set of the base-lines are right-angled, and the directions of coordination of base lines at which main reflective elements face each other and the directions of coordination of base lines at which sub-reflective elements face each other are mutually right-angled.

Figure 8:
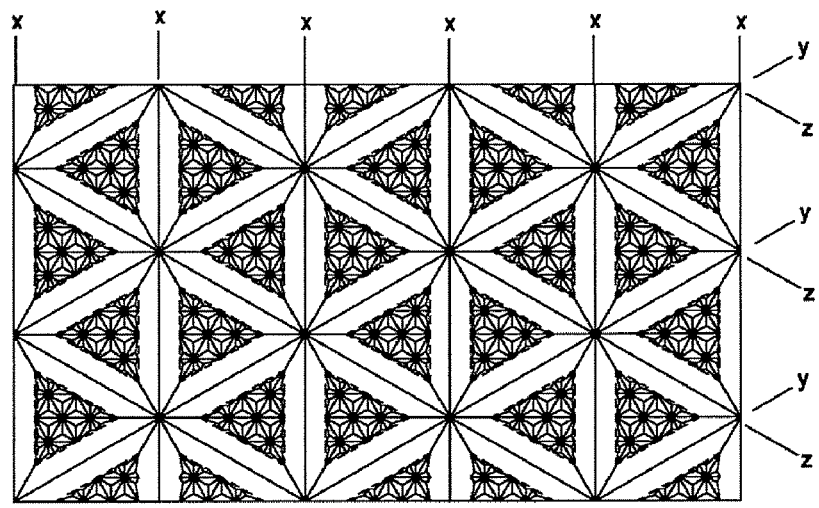
FIG. 8 shows an assembly of retroreflective elements according to the present invention.

In FIG. 8, the composite triangular-pyramidal cube-corner retroreflective elements as illustrated in FIG. 7 are arrayed at the closest-packed state, having in common base lines of the main reflective elements. The main reflective elements are configured by the three-directional V-shaped parallel groove groups (x, y, z) which have substantially symmetrical sections. None of the three-directional V-shaped parallel groove groups forming the sub-reflective elements parallels with any of the V-shaped parallel groove groups (x, y, z) forming the main reflective elements, and the base lines of the V-shaped grooves are on the common sub-plane (SH-SH). Furthermore, the base line of one V-shaped groove defining the sub-reflective elements is perpendicular to the V-shaped parallel groove group (x) forming the main reflective elements.

Those composite reflective elements formed by combinations of main reflective elements and sub-reflective elements having mutually right-angled coordination directions, as illustrated in FIGS. 7 and 8, exhibit retroreflective performance with improved azimuth angularity and observation angularity. Furthermore, when reflective elements with tilted optical axes are used as the main reflective elements or sub-reflective elements, improvement in entrance angularity can also be accomplished to gain further advantage. It is also permissible that no set of the three-directional base lines of the main reflective elements with the three-directional base lines defining the sub-reflective elements parallels at any of the directions.

The improvement in entrance angularity can be accomplished either when the direction of tilt in optical axes of the composite retroreflective elements as illustrated in FIGS. 7 and 8, i.e., (q-p), is positive or negative. It is preferable that the composite retroreflective elements have an angle of tilt in optical axes of the sub-reflective elements and/or main reflective elements within a range of 1-13°, in particular, 1.5-7°.

Figure 9:
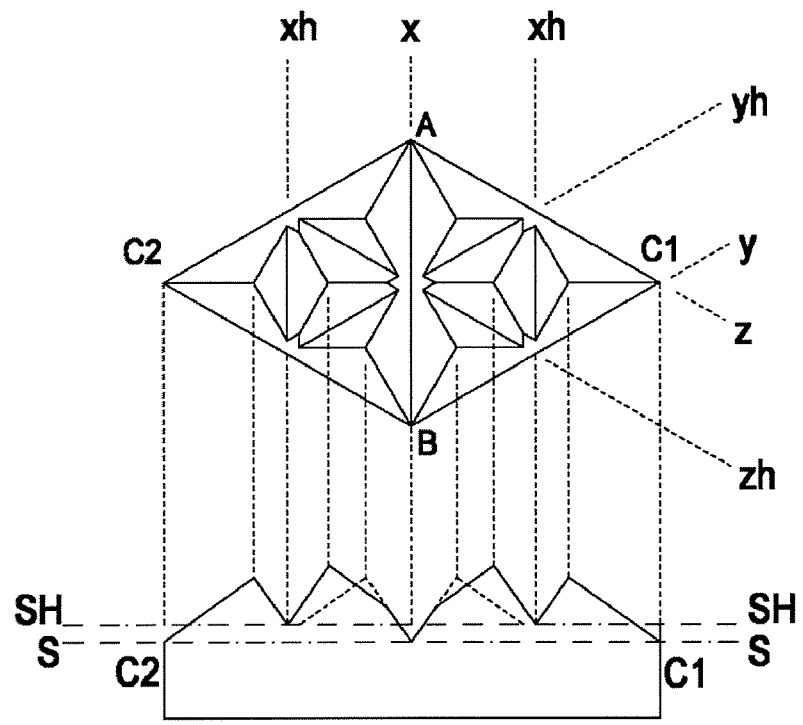
FIG. 9 shows a retroreflective element according to the present invention.

FIG. 9 shows another embodiment of a composite retroreflective element pair according to the present invention. While FIG. 9 shows an embodiment of the composite triangular-pyramidal cube-corner retroreflective elements similar to those in FIGS. 3 and 6 according to the present invention, wherein the shapes of the bases are regular triangles and the optical axes are not tilted, the number of the sub-reflective elements formed on each one of the main reflective elements (A-C1-B and A-C2-B) is 4.

The main reflective elements (A-C1-B and A-C2-B) in FIG. 9 are formed on a common plane (S-S) which is determined by a large number of V-shaped grooves (x, y, z). On the other hand, those many sub-reflective elements are formed by the many V-shaped grooves (xh, yh, zh), and are present on another common plane (SH-SH) which is determined by said many V-shaped grooves (xh, yh, zh). The common plane (S-S) is located at a level lower than that of the other common plane (SH-SH). Intervals between those many V-shaped grooves (x, y, z) and the other groups of many V-shaped grooves (xh, yh, zh) are designed to be the same, and they differ only in depth.

Similarly to those composite reflective elements as illustrated in FIGS. 3 and 6, in the composite reflective elements of FIG. 9 all of the three-directional base lines defining the main reflective elements and the other three-directional base lines defining the sub-reflective elements are in parallel, the triangles providing the base lines are similar, and in all of the elements the angle of tilt in optical axes is 0°.

Figure 10:
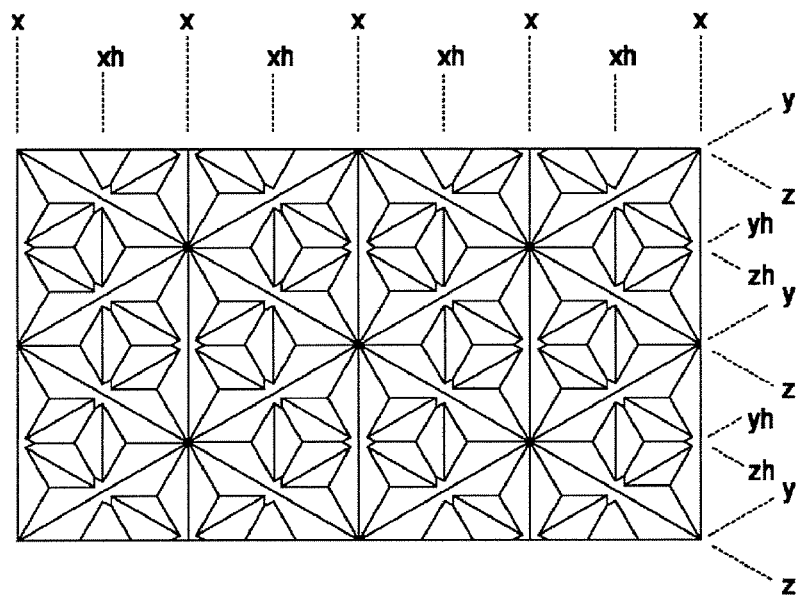
FIG. 10 shows an assembly of retroreflective elements according to the present invention.

FIG. 10 shows an assembly of the composite retroreflective element pair as shown in FIG. 9. In FIG. 10, the composite triangular-pyramidal cube-corner retroreflective elements as illustrated in FIG. 9 are arrayed in the closest-packed state, having the base lines of the main reflective elements in common. The large number of V-shaped grooves (xh, yh, zh) forming the large number of sub-reflective elements of FIG. 10 give no continuous linear or curved locus. A group of the sub-reflective elements on one main reflective element may take a locus differing from that of the other sub-reflective elements on adjacent main reflective element(s). Adoption of various loci is effective for improving observation angularity.

Figure 11:
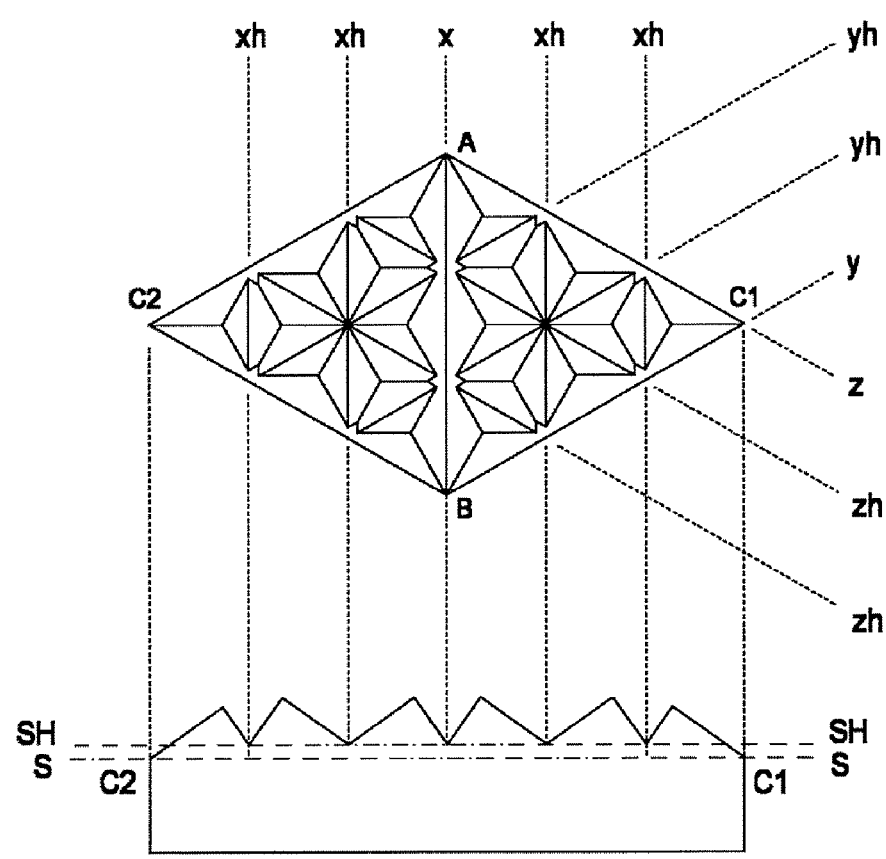
FIG. 11 shows a retroreflective element according to the present invention.

FIG. 11 illustrates another embodiment of the composite retroreflective element pair according to the present invention. While FIG. 11 shows another embodiment of a composite triangular-pyramidal cube-corner retroreflective element similarly to FIG. 9, having regular triangular bases and untilted optical axes, the number of the sub-reflective elements formed on each main reflective element (A-C1-B or A-C2-B) is 9.

The main reflective elements (A-C1-B and A-C2-B) in FIG. 11 are formed on a common plane (S-S) which is determined by a large number of V-shaped grooves (x, y, z). On the other hand, a large number of the sub-reflective elements are formed by a large number of V-shaped grooves (xh, yh, zh) and are present on another common plane (SH-SH) which is determined by the large number of V-shaped grooves (xh, yh, zh). The common plane (S-S) is present at a lower level than the other common plane (SH-SH). Also the intervals between the large number of V-shaped grooves (x, y, z) and the other large number of V-shaped grooves (xh, yh, zh) are the same, and the grooves differ only in depth.

Similarly to the composite reflective elements as shown in FIG. 9, in the composite reflective elements of FIG. 11 the three-directional base lines forming the main reflective elements and the other three-directional base lines forming the sub-reflective elements are paralleled, the triangles formed by the base lines are similar, and in all of the elements the angle of tilt in optical axes is 0°.

FIGS. 9-11 show the embodiments wherein all of the composite reflective elements, and the main and sub-reflective elements constituting the composite reflective elements, have optical axes with angle of tilt of 0°. Whereas the optical axes of the composite reflective elements and those of the main and sub-reflective elements constituting the composite reflective elements as shown in FIGS. 9-11 may be tilted in positive or negative direction. It is preferable that the angle of tilt of the optical axes is within a range of 1-13°, in particular, 1.5-7°. The depths of V-shaped grooves (xh, yh, zh) configuring sub-reflective elements having optical axes with 0° angle of tilt preferably are the same.

On the other hand, depths of V-shaped grooves (xh, yh, zh) configuring sub-reflective elements with tilted optical axes may not be the same. In such sub-reflective elements whose optical axes are negatively tilted, preferably the V-shaped grooves in xh direction are given a depth shallower than those of the V-shaped grooves in yh and zh directions. Whereas, in sub-reflective elements whose optical axes are positively tilted, preferably the V-shaped grooves in xh direction are given a depth deeper than those of the V-shaped grooves in yh and zh directions.

It is unnecessary that the sub-plane (SH-SH) and the main plane (S-S) of composite reflective elements according to the invention are always paralleled. In occasions of forming large size composite reflective elements, non-parallel planes can be adopted. Whereas, in case of making small size composite reflective elements like those used for retroreflective sheeting, the sub-plane (SH-SH) and main plane (S-S) are preferably in parallel, for easier formation of the elements.

The size of main reflective elements in composite reflective elements according to the present invention is preferably such that the distance (hm) from the imaginary apex (Hm) at which extended faces of three reflective lateral faces forming the main reflective element would intersect, to the main plane (S-S) is at least 50 μm. When the distance (hm) in the main reflective element is less than 50 μm, size of the sub-reflective elements which can be formed on the main reflective element becomes too small and invites such undesirable effect as excessive divergence of reflected light or reduction in retroreflective performance.

Furthermore, the composite reflective elements to be used for retroreflective sheeting preferably have the distance (hm) not less than 50 μm, in particular, within a range of 80-300 μm. Where the distance (hm) of the main reflective element exceeds 300 μm, resulting retroreflective sheeting becomes too thick to provide a pliable sheeting.

According to the invention, it is preferable that the ratio (hs/hm) of the distance (hs) from the apex (Hs) of a sub-reflective element to the sub-plane (SH-SH) to the distance (hm) from the imaginary apex (Hm) to the main plane (S-S) lies within a range of 0.1-0.5, in particular, 0.1-0.3.

Where the ratio (hs/hm) is less than 0.1, size of the sub-reflective elements becomes too small, and where it exceeds 0.5, size of the sub-reflective elements becomes too large and the areal ratio of effective reflective lateral faces of main reflective element becomes too small, causing reduction in retroreflectivity.

The ratio (hp/hm) of the distance (hp) from the imaginary apex (Hm) of the main reflective element to the sub-plane (SH-SH) to the distance (hm) from the imaginary apex (Hm) of the main reflective element to the main plane (S-S) preferably lies within a range of 0.1-0.9, in particular, 0.3-0.5.

Where the ratio (hp/hm) is less than 0.1, shape of the sub-reflective elements becomes too small and an improvement in observation angularity to be achieved by the sub-reflective elements is hardly brought about. Whereas, when it exceeds 0.9, the areal ratio of reflective lateral faces of main reflective element becomes excessively small to deteriorate retroreflective performance.

Adoption of those various retroreflective elements as explained in detail in the technical background or other known retroreflective elements as the triangular-pyramidal cube-corner retroreflective elements useful for the composite reflective elements of the present invention can accomplish further improvement in retroreflective performance.

Those composite reflective elements according to the present invention can be manufactured by heretofore known methods such as fly cutting, ruling or shaper method. The reflective elements can be manufactured by cutting three-directional V-shaped grooves with such a mechanical processing means as above. Either order of manufacturing steps wherein sub-reflective elements are formed and then deeper grooves are cut to form main reflective elements or, after forming main reflective elements, shallow grooves may be formed on the main reflective elements to form the sub elements, can be adopted.

Those three reflective lateral faces of each cube-corner reflective element constituting the composite reflective element according to the present invention preferably cross each other substantially perpendicularly, while it is also possible to give a deviation (prism angle deviation) to the mutually perpendicular angle, for slightly diverging reflected light to improve observation angularity. For that purpose, such means can be used as giving a deviation to groove angles of the V-formed grooves in each direction; slightly incurvating side walls of the V-shaped grooves so that their sections are made of curved lines; shifting loci of bottoms of the V-shaped grooves polygonally to render the reflective lateral faces polyhedral; or shifting loci of bottoms of the V-shaped grooves in a curved line to render the reflective lateral faces curved.

Those many V-shaped grooves (xh, yh, zh) forming the many sub-reflective elements as shown in the present invention do not provide continuous linear or curved loci. The loci may be different from those of other sub-reflective elements formed on adjacent main reflective element(s). Adoption of such various loci is effective for improving observation angularity. It is possible to deviate groove angles of those many V-shaped grooves (xh, yh, zh) forming sub-reflective elements on main reflective elements by each different means for each direction. Such means as giving a deviation to groove angles of the V-formed grooves in each direction for each different kind of reflective elements; slightly incurvating side walls of the V-shaped grooves so that their sections are made of curved lines; shifting loci of bottoms of the V-shaped grooves polygonally to render the reflective lateral faces polyhedral; or shifting loci of bottoms of the V-shaped grooves in a curved line to render the reflective lateral faces curved, can be used independently of each other.

It is particularly preferable to polygonally shift loci of bottoms of the V-shaped grooves forming the sub-reflective lateral faces to render the faces polyhedral. Also adoption of such a means as shifting loci of bottoms of the V-shaped grooves forming the sub-reflective lateral faces in a curved line, to give curved reflective lateral faces is particularly preferred.

Furthermore, of the loci of bottoms of the three-directional V-shaped grooves forming the sub-reflective elements contained in one main reflective element, preferably those in at least one of the directions are different from the loci of V-shaped grooves in the same direction forming the sub-elements on the adjacent main reflective element(s). For example, when loci of bottoms of V-shaped grooves forming sub-reflective elements contained in one main reflective element are polygonally shifted to render the reflective lateral faces polyhedral, loci of bottoms of the V-shaped grooves in the same direction, which form the sub-reflective elements on the adjacent main reflective elements, may be shifted in a curved line to render the reflective lateral faces curved. Retroreflective elements having such configurations exhibit excellent observation angularity. Where loci of bottoms of the grooves are shifted polygonally or curved, preferably a deviation to straight line in the range of about 0.05-1% of a base line length of one reflective element is added.

Furthermore, of the three-directional V-shaped groove groups forming sub-reflective elements, preferably at least one-directioned group have a sectional shape differing from that of the V-shaped groove group(s) in the same direction, which form the sub-reflective elements contained in the adjacent main reflective elements. Sectional shapes as referred to herein means those resulting from adding a minor deviation to groove angle of V-shaped section, or slightly curving the V-shaped section to give curved lateral faces. For example, a V-shaped section of grooves forming sub-reflective elements contained in one main reflective element is rendered different from that of V-shaped grooves of the same direction which form sub-reflective elements contained in the adjacent main reflective elements. Retroreflective elements having such configurations exhibit excellent observation angularity.

Materials useful for the composite reflective elements according to the invention are not critical, but those conventionally used resin and coloring agent can be suitably used. As constructions of retroreflective sheeting or retroreflective articles using the composite reflective elements, known constructions of such products can be suitably adopted.

EXAMPLES

Hereinafter the particulars of the present invention are explained more specifically, referring to working Examples, it being understood that the invention is not limited to the Examples only.

<Coefficient of Retroreflection>

Coefficient of retroreflection referred to in the specification, in particular, in Examples, was measured by the following method. Using a reflectometer "Model 920" of Gamma-Scientific Co., coefficients of retroreflection of each 100 mm×100 mm retroreflective sheeting were measured following ASTM E810-91 at optional five spots, under the angular conditions of observation angle, 0.2° and 0.5°; and incident angles, 5°, 10°, 20° and 30°. The mean values of the measured values are indicated as the coefficients of retroreflection of the measured retroreflective sheeting.

Comparative Example 1

A brass mold in which a large number of tilted triangular-pyramidal cube-corner retroreflective elements were arrayed was prepared by fly cutting method, under the processing conditions that the tilted triangular-pyramidal cube-corner retroreflective elements of a configuration as illustrated in FIG. 2 having optical axes tilted by +70 were formed, with an element height (h) of 130 μm; interior angle of x-directioned parallel V-formed grooves, 56.5° and repetitive pitch, 311.7 μm; interior angle of y- and z-directioned parallel V-shaped grooves, 77.0° and repetitive pitch, 266.8 μm; and the crossing angle of x-direction with y- and z-directions of 64.7.

Using this brass master mold, a female cube-corner forming die with reversed configuration made of nickel was prepared by electroforming method using a nickel sulfamate solution of 55% in concentration. Compression molding a 200 μm-thick polycarbonate resin sheet (Iupilon™ H3000, Mitsubishi Engineering Plastics K.K.) using this molding die, under the conditions of molding temperature of 200° C. and molding pressure of 50 kg/cm$^2$, the resin sheet was cooled to 30° C. under the elevated pressure and withdrawn. Thus a retroreflective sheeting (Comparative product 1) having on its surface a large number of polycarbonate resin composite cube-corner retroreflective elements arrayed in the closest-packed state was prepared.

Example 1

A composite retroreflective element of the configuration as illustrated in FIG. 3 wherein, on a main reflective element having an optical axis with an angle of tilt of +7° and a distance (hm) from the imaginary apex (Hm) at which the three reflective lateral faces forming the main reflective element would cross with each other, to the main plane (S-S) of 130 μm, a group of four sub-reflective elements were arrayed, each having an optical axis with an angle of tilt of +7° and a height (hs) of 30 μm, was prepared by the same method as used in Comparative Example 1.

The ratio (hs/hm) of the distance (hs) from the apex (Hs) of the sub-reflective element to the sub-plane (SH-SH) to the distance (hm) from the imaginary apex (Hm) of the main reflective element to the main plane (S-S) in the composite reflective element was 0.23, the distance (hp) from the imaginary apex (Hm) of the main reflective element to the sub-reflective plane (SH-SH) was 50 μm, and the ratio (hp/hm) was 0.385.

By the same compression molding method as practiced in Comparative Example 1, a retroreflective sheeting (Product 1 of the present invention) was prepared, in which a large number of polycarbonate composite cube-corner retroreflective elements were arrayed in the closest-packed state.

Example 2

A composite retroreflective element of the configuration as illustrated in FIG. 6 wherein, on a main reflective element having an optical axis with an angle of tilt of +7° and a distance (hm) from the imaginary apex (Hm) at which the three reflective lateral faces forming the main reflective element would cross with each other, to the main plane (S-S) of 130 μm, a group of sixteen sub-reflective elements were arrayed, each having an optical axis with an angle of tilt of +7° and a height (hs) of 30 μm, was prepared by the same method as used in Comparative Example 1.

The ratio (hs/hm) of the distance (hs) from the apex (Hs) of the sub-reflective element to the sub-plane (SH-SH) to the distance (hm) from the imaginary apex (Hm) of the main reflective element to the main plane (S-S) in the composite reflective element was 0.23, the distance (hp) from the imaginary apex (Hm) of the main reflective element to the sub-reflective plane (SH-SH) was 65 μm, and the ratio (hp/hm) was 0.5.

By the same compression molding method as practiced in Comparative Example 1, a retroreflective sheeting (Product 2 of the present invention) was prepared, in which a large number of polycarbonate composite cube-corner retroreflective elements were arrayed in the closest-packed state.

Example 3

A composite retroreflective element of the configuration as illustrated in FIG. 9 wherein, on a main reflective element having an optical axis with an angle of tilt of −6° and a distance (hm) from the imaginary apex (Hm) at which the three reflective lateral faces forming the main reflective element would cross with each other, to the main plane (S-S) of 180 μm, a group of four sub-reflective elements were arrayed, each having an optical axis with an angle of tilt of −6° and a height (hs) of 70 μm, was prepared by the same method as used in Comparative Example 1. Because the four sub-reflective elements had slightly different heights, the distance between the apex of the central, highest sub-reflective element and the sub-plane (SH-SH) was chosen as the height hs.

The ratio (hs/hm) of the distance (hs) from the apex (Hs) of the sub-reflective element to the sub-plane (SH-SH) to the distance (hm) from the imaginary apex (Hm) of the main reflective element to the main plane (S-S) in the composite reflective element was 0.39, the distance (hp) from the imaginary apex (Hm) of the main reflective element to the sub-reflective plane (SH-SH') was 160 μm, and the ratio (hp/hm) was 0.89.

By the same compression molding method as practiced in Comparative Example 1, a retroreflective sheeting (Product 3 of the present invention) was prepared, in which a large number of polycarbonate composite cube-corner retroreflective elements were arrayed in the closest-packed state.

Coefficients of retroreflection of the retroreflective sheetings (Products 1, 2 and 3 of the present invention) in which multitude of the composite cube-corner retroreflective elements as prepared in the above Examples 1-3 were respectively arrayed in the closest-packed state, and those of the triangular-pyramidal cube-corner retroreflective sheeting (Comparative product 1) as prepared in Comparative Example 1 are shown in Table 1. The coefficients of retroreflection of retroreflective sheetings according to Examples 1 and 2 of the present invention demonstrated excellent retroreflectivity, particularly at greater observation angles and at increasing incident angles, in comparison with coefficients of retroreflection of the triangular-pyramidal cube-corner retroreflective sheeting of Comparative Example 1 according to conventional art.

TABLE 1

| Observation Angle | Incident Angle | Product 1 of the Invention | Product 2 of the Invention | Product 3 of the Invention | Comparative Product 1 |
|---|---|---|---|---|---|
| 0.2° | 5° | 650 | 587 | 620 | 750 |
| 0.2° | 10° | 576 | 535 | 528 | 651 |
| 0.2° | 20° | 417 | 466 | 494 | 447 |
| 0.2° | 30° | 377 | 400 | 422 | 324 |
| 0.5° | 5° | 350 | 375 | 366 | 436 |
| 0.5° | 10° | 302 | 335 | 334 | 315 |
| 0.5° | 20° | 152 | 198 | 252 | 94 |
| 0.5° | 30° | 96 | 147 | 157 | 45 |

INDUSTRIAL APPLICABILITY

Triangular-pyramidal cube-corner retroreflective sheetings and retroreflective articles according to the present invention can be used for signs (common traffic signs, delineators), road surface signs (pavement marker), construction signs and the like; number plates on vehicles such as automobiles, motorcycles and the like; safety materials such as reflective tapes stuck on bodies of tracks, trailers, clothing, life preservers and the like; marking on signboards and the like; and reflection plates of visible light-, laser beam- or infrared light-reflective sensors; and can improve retroreflective performance of these products.

The invention claimed is:

1. Triangular-pyramidal cube-corner retroreflective sheeting or retroreflective article, comprising:
composite cube-corner retroreflective elements comprising groups of at least two sub-reflective elements, said two sub-reflective elements each comprising triangular-pyramidal cube-corner retroreflective elements having a diffraction effect and being defined by three lateral faces mutually crossing at approximately right angles, as configured by three-directional V-shaped parallel groove groups having substantially symmetrical sections and intersecting with each other, and which are arrayed in the closest-packed state, projecting on one side of their common sub-plane (SH-SH), each of said groups of sub-reflective elements being disposed on one main reflective element comprising a triangular-pyramidal retroreflective element which is defined by three lateral faces mutually crossing at approximately right angles, as being configured by three-directional V-shaped parallel groove groups having substantially symmetrical sections and intersecting with each other, and which is disposed on the main plane (S-S),
wherein among the three-directional base lines forming the main reflective elements and the other three-directional base lines forming the sub-reflective elements, no set of the base lines in any of the directions are parallel.

2. The triangular-pyramidal cube-corner retroreflective sheeting or retroreflective article according to claim 1, wherein the sub-plane (SH-SH) and the main plane (S-S) are parallel.

3. The triangular-pyramidal cube-corner retroreflective sheeting or retroreflective article according to claim 1, wherein said composite cube-corner retroreflective elements regularly project on said one side of their common sub-plane (SH-SH).

4. The triangular-pyramidal cube-corner retroreflective sheeting or retroreflective article according to claim 1, wherein the sub-plane (SH-SH) and the main plane (S-S) are parallel, and said composite cube corner retroreflective elements regularly project on said one side of their common sub-plane (SH-SH).

5. The triangular-pyramidal cube-corner retroreflective sheeting or retroreflective article according to claim 1, 2, 3 or 4 wherein the optical axes of the sub-reflective elements and/or the main reflective elements are tilted.

6. The triangular-pyramidal cube-corner retroreflective sheeting or retroreflective article according to claim 5, wherein the optical axes of the sub-reflective elements and/or the main reflective elements are tilted 1-13°.

7. The triangular-pyramidal cube-corner retroreflective sheeting or retroreflective article according to claim 6, wherein the optical axes of the sub-reflective elements and/or the main reflective elements are tilted 1.5-7°.

8. The triangular-pyramidal cube-corner retroreflective sheeting or retroreflective article according to claim 7, wherein the distance (hm) from the imaginary apex (Hm) at which the three reflective lateral faces forming a main reflective element would intersect when extended, to the main plane (S-S) is at least 80-300 μm.

9. The triangular-pyramidal cube-corner retroreflective sheeting or retroreflective article according to claim 8, wherein the ratio (hs/hm) of the distance (hs) from the apex (Hs) of the sub-reflective element to the sub-plane (SH-SH) to the distance (hm) from the imaginary apex (Hm) of the main reflective element to the main plane (S-S) is 0.1-0.3.

10. The triangular-pyramidal cube-corner retroreflective sheeting or retroreflective article according to claim 9, wherein the ratio (hp/hm) of the distance (hp) from the imaginary apex (Hm) of the main reflective element to the sub-plane (SH-SH) to the distance (hm) from the imaginary apex (Hm) to the main plane (S-S) is 0.3-0.5.

11. The triangular-pyramidal cube-corner retroreflective sheeting or retroreflective article according to claim 6, wherein the distance (hm) from the imaginary apex (Hm) at which the three reflective lateral faces forming a main reflective element would intersect when extended, to the main plane (S-S) is at least 50 μm.

12. The triangular-pyramidal cube-corner retroreflective sheeting or retroreflective article according to claim 6, wherein the ratio (hs/hm) of the distance (hs) from the apex (Hs) of the sub-reflective element to the sub-plane (SH-SH) to the distance (hm) from the imaginary apex (Hm) of the main reflective element to the main plane (S-S) is 0.1-0.5.

13. The triangular-pyramidal cube-corner retroreflective sheeting or retroreflective article according to claim 12, wherein the ratio (hp/hm) of the distance (hp) from the imaginary apex (Hm) of the main reflective element to the sub-plane (SH-SH) to the distance (hm) from the imaginary apex (Hm) to the main plane (S-S) is 0.1-0.9.

14. Triangular-pyramidal cube-corner retroreflective sheeting or retroreflective article according to claim 11, wherein, among the three-directional base lines forming the main reflective elements and the other three-directional base lines forming the sub-reflective elements, directions of at least one set of the base lines are parallel.

15. Triangular-pyramidal cube-corner retroreflective sheeting or retroreflective article according to claim 1, wherein, among the three-directional base lines forming the main reflective elements and the other three-directional base lines forming the sub-reflective elements, the angle made between one set of the base lines is 30°-60°.

16. Triangular-pyramidal cube-corner retroreflective sheeting or retroreflective article according to claim 1, wherein, among the three-directional base lines forming the main reflective elements and the other three-directional base lines forming the sub-reflective elements, one set of the base lines are right-angled.

17. Triangular-pyramidal cube-corner retroreflective sheeting or retroreflective article according to claim 16, wherein, among the loci of bottoms of the three-directional V-shaped grooves configuring the sub-reflective elements, the loci in at least one direction differ from the loci of the V-shaped grooves of the same direction forming sub-reflective elements contained in an adjacent main reflective element.

18. Triangular-pyramidal cube-corner retroreflective sheeting or retroreflective article according to claim 17, wherein, among the three-directional V-shaped grooves configuring the sub-reflective elements, the sectional shape of the grooves in at least one direction differs from that of the V-shaped grooves of the same direction forming sub-reflective elements contained in an adjacent main reflective element.

* * * * *

UNITED STATES PATENT AND TRADEMARK OFFICE
CERTIFICATE OF CORRECTION

PATENT NO. : 7,950,813 B2
APPLICATION NO. : 11/718310
DATED : May 31, 2011
INVENTOR(S) : Ikuo Mimura It is certified that error appears in the above-identified patent and that said Letters Patent is hereby corrected as shown below:

ON TITLE PAGE AT (57) ABSTRACT

Line 14, "is" should read --are--.

COLUMN 1:

Line 44, "is" should read --are--.

COLUMN 2:

Line 18, "head lamps" should read --headlamps--; and
Line 51, "have been made" should be deleted.

COLUMN 4:

Line 12, "periodical" should read --periodic--;
Line 37, "whereby" should read --thereby--;
Line 48, "Bruke, et al" should read --Bruke et al.--; and
Line 49, "Nestegard, et al," should read --Nestegard, et al.,--.

COLUMN 5:

Line 8, "shortage" should read --disadvantage--.

COLUMN 8:

Line 24, "its" should read --their--;
Line 29, "that" should be deleted;
Line 46, "similarly" should read --similar--;

Signed and Sealed this
Twenty-third Day of August, 2011

David J. Kappos
*Director of the United States Patent and Trademark Office*

CERTIFICATE OF CORRECTION (continued)
U.S. Pat. No. 7,950,813 B2

Line 49, "a" should be deleted; and
Line 50, "similarly" should read --similar--.

COLUMN 9:

Line 63, "Similarly" should read --Similar--.

COLUMN 10:

Line 19, "similarly" should read --similar--; and
Line 35, "Similarly" should read --Similar--.

COLUMN 13:

Line 2, "those" should be deleted; and
Line 3, "used" should be deleted.

COLUMN 14:

Line 59, "plane (SH-SH')" should read --plane (SH-SH)--.

COLUMN 15:

Line 62, "is" should read --are--; and
Line 67, "are" should read --is--.

COLUMN 16:

Line 53, "claim 6," should read --claim 11,--.

COLUMN 17:

Line 14, "are" should read --is--.